(12) United States Patent
Keggenhoff et al.

(10) Patent No.: US 10,143,987 B2
(45) Date of Patent: Dec. 4, 2018

(54) METHOD FOR DIVIDING FLUID STREAMS

(75) Inventors: Berthold Keggenhoff, Krefeld (DE);
Jeffrey Bolton, Moundsville, WV (US);
Friedhelm Steffens, Leverkusen (DE);
Marc Seekamp, Köln (DE); Gerhard Ruffert, Leverkusen (DE); Jürgen Kern, Geisenheim (DE); Thomas Runowski, Düsseldorf (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 2490 days.

(21) Appl. No.: 12/544,267

(22) Filed: Aug. 20, 2009

(65) Prior Publication Data
US 2010/0071770 A1   Mar. 25, 2010

(30) Foreign Application Priority Data
Aug. 27, 2008 (DE) .......... 10 2008 039 947

(51) Int. Cl.
*B01J 8/44* (2006.01)
*B01D 3/00* (2006.01)
*F26B 3/08* (2006.01)

(52) U.S. Cl.
CPC ............ *B01J 8/44* (2013.01); *B01D 3/008* (2013.01); *F26B 3/082* (2013.01); *B01J 2208/00707* (2013.01); *Y10T 137/0318* (2015.04); *Y10T 137/85938* (2015.04)

(58) Field of Classification Search
CPC ............ B01J 8/44; B01D 3/008; F26B 3/082
USPC ......... 239/553, 553.3, 553.5, 556, 557, 568, 239/589, 590, 590.3, 590.5, 592, 593, 239/594, 595, 601; 137/1, 561 A
See application file for complete search history.

(56) References Cited

U.S. PATENT DOCUMENTS

| | | | |
|---|---|---|---|
| 3,810,583 A * | 5/1974 | George | ............... 239/597 |
| 4,532,087 A | 7/1985 | Boronyak et al. | |
| 4,885,848 A | 12/1989 | Christensen | |
| 5,161,315 A | 11/1992 | Long | |
| 5,209,259 A * | 5/1993 | Dear et al. | ............... 137/561 A |
| 5,244,154 A * | 9/1993 | Buchholz et al. | ........ 239/590.3 |
| 5,753,191 A | 5/1998 | Yamamoto et al. | |
| 5,759,505 A | 6/1998 | Nolin et al. | |
| 5,783,119 A | 7/1998 | Ulrich et al. | |
| 5,899,390 A * | 5/1999 | Arndt et al. | ............... 239/553 |
| 6,169,161 B1 | 1/2001 | Tachibana et al. | |

(Continued)

FOREIGN PATENT DOCUMENTS

DE   2752391 A1   5/1979
EP   0299279 B1   4/1993
(Continued)

OTHER PUBLICATIONS

H. Müller-Steinhagen, "Heat-Exchanger Fouling—Mitigation and Cleaning Technologies", Publico Publications, pp. 8-9, Essen 2000, ISBN 3-934736-00-9.

*Primary Examiner* — Ryan A Reis
(74) *Attorney, Agent, or Firm* — Donald R. Palladino

(57) ABSTRACT

One or more fluid streams are uniformly divided into two or more partial fluid streams in chemical apparatuses in a manner such that there is a reduced tendency to form deposits. Division of such stream(s) is achieved by using a distributor device that includes at least one plate having two or more openings which openings are rounded or chamfered on at least one side.

9 Claims, 4 Drawing Sheets

(56) References Cited

U.S. PATENT DOCUMENTS

| | | |
|---|---|---|
| 6,551,556 B1 | 4/2003 | Park et al. |
| 6,705,025 B2 | 3/2004 | Werner et al. |
| 7,094,382 B2 | 8/2006 | Bengtsson et al. |
| 7,316,067 B2 * | 1/2008 | Blakey .................. 29/896.6 |
| 8,221,674 B2 | 7/2012 | Hauzenberger et al. |
| 2003/0070318 A1 | 4/2003 | Werner et al. |
| 2004/0256487 A1* | 12/2004 | Collins et al. ............ 239/338 |
| 2009/0039573 A1 | 2/2009 | Hauzenberger et al. |

FOREIGN PATENT DOCUMENTS

| | | | |
|---|---|---|---|
| EP | 0721798 B1 | | 3/2002 |
| JP | 51110478 A | * | 9/1976 |
| JP | 51110478 A | | 9/1976 |
| SU | 1095918 A1 | | 6/1984 |

* cited by examiner

METHOD FOR DIVIDING FLUID STREAMS

BACKGROUND OF THE INVENTION

This invention relates to a method for uniformly dividing fluid streams into two or more partial fluid streams in chemical apparatuses which, compared with conventional devices, have a reduced tendency to form deposits.

In chemical technology, the chemical reaction apparatuses that are used frequently employ devices for the uniform distribution of fluid streams within the reaction apparatuses. Such devices are frequently also referred to as internals.

A specific form of such internals are so-called plates, among which so-called distributor plates form a special case. Such distributor plates are frequently used in chemical reaction apparatuses, such as, for example, columns or heat exchangers.

Such distributor plates are conventionally in the form of a flat horizontal surface (the plate) provided with apertures through which the particular fluid stream enters the remainder of the chemical apparatus. As a result of the flow through the apertures, zones characterised by a reduced fluid velocity or by a recirculation flow conventionally form on the distributor plate at sites of geometric irregularity (e.g. 90° angle at openings or apertures such as drilled holes, etc.).

When the fluid entering the chemical reaction apparatus through the openings or apertures contains dissolved substances or suspensions of particles, deposits of those substances and/or particles conventionally form in zones with reduced fluid velocity or recirculation flow. This phenomenon is generally known and is described, for example, in H. Müllller-Steinhagen "Heat-Exchanger Fouling-Mitigation and Cleaning Technologies" Publico Publications, pp. 8-9, Essen 2000. ISBN 3-934736-00-9.

IN-A-192183 discloses a device which is said to permit the uniform distribution of liquids in columns. This device is characterised by a main distributor (10) and secondary distributors (11) connected thereto, which are in turn connected to the actual distributing distributor plates (4) via a pipe (2). The actual uniform distribution of the liquid is effected by dripping down from the distributor plate (4) along guide walls (5), which are structured and are arranged around the distributor plate (4), leaving a narrow gap. The precise geometric form of the apertures present in the device is not disclosed. The reference numerals used here relate to the reference numerals used in IN-A-192183.

The device described in IN-A-192183 is disadvantageous in particular because the narrow gap between the distributor plate (4) and the guide wall (5) forms a zone in which the flow of the liquid is slowed down considerably and may be subjected to recirculation. Therefore, when such a device is used, it is assumed that deposits of substances dissolved/suspended in the liquid will occur. The device further comprises many sites of geometric irregularity, such as the edge of the distributor plate (4) as well as the bores of the discharge openings (12), at which the formation of deposits is very probable for the above-mentioned reasons.

DE-A-2 752 391 discloses a device for the uniform distribution of liquids which consists of parallel channels with overflow edges (3, 6) having V-shaped liquid outlet openings. The amount of liquid distributed is determined by adjusting an interval (7) between two parallel overflow edges, as well as by the size and number of V-shaped liquid outlet openings. The precise geometric form of the V-shaped liquid outlet openings, and in particular the angle of incidence, are not disclosed. The reference numerals used here relate to the reference numerals used in DE-A-2 752 391.

The device described in DE-A-2 752 391 has a large number of sites of geometric irregularity. For example, both the edge of the V-shaped liquid outlet openings and the overflow edge are characterised by such geometric irregularities. It is therefore to be assumed that reduced liquid velocities and/or recirculation flows will occur in particular at such sites, and deposits will thus form if the liquid to be distributed contains dissolved/suspended substances.

SUMMARY OF THE INVENTION

In view of the problems encountered with prior art devices with respect to division of liquids or liquid streams containing dissolved and/or suspended substances, the object of the present invention is to provide a method in which fluid streams, and in particular liquid streams, containing dissolved and/or suspended substances can be uniformly divided in chemical apparatuses without the formation of deposits of the dissolved and/or suspended substances on the device.

This and other objects which will be apparent to those skilled in the art are achieved by employing the distributor plates described in detail herein in the method described in greater detail herein.

DETAILED DESCRIPTION OF THE PRESENT INVENTION

Figure 1:
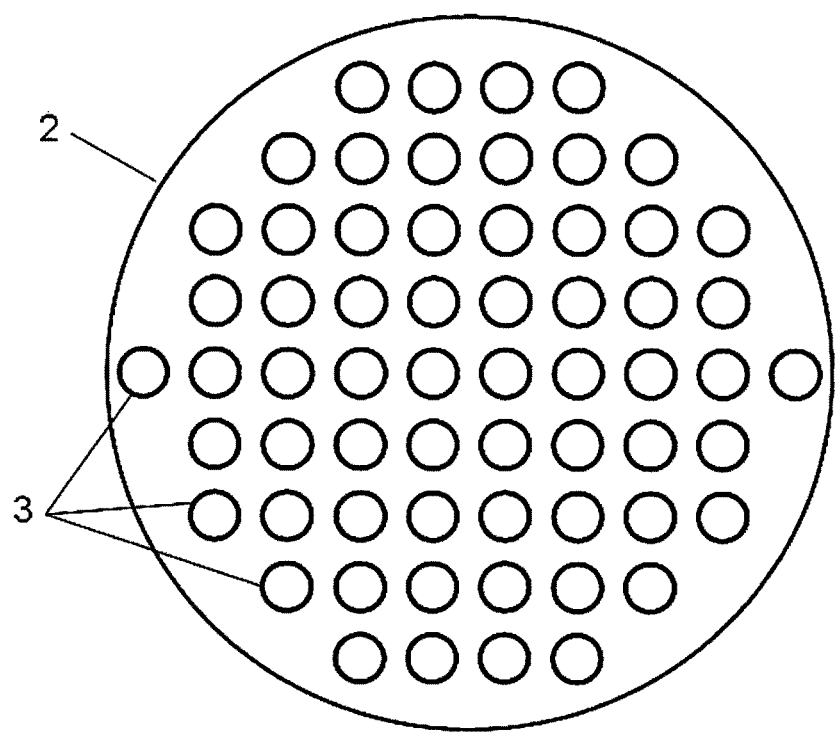
FIG. 1 illustrates a distributor device suitable for carrying out the method of the present invention.

The present invention is directed to a method for dividing fluid streams into two or more partial fluid streams in chemical apparatuses, in which at least one fluid stream is passed into a distributor device which includes at least one plate 2 having two or more openings 3. The openings 3 are rounded or chamfered on at least one side of the plate. The partial fluid streams subsequently flow through the openings 3.

In the context of the present invention, "fluid(s)" means any liquids and/or gases in the supercritical, subcritical or critical state. The particular state of the liquid and/or gas is determined by the conditions before and/or after the fluid stream passes through the device in accordance with the present invention. The state of the liquid and/or gas is not important for the invention. It is even possible for the state of the fluid to change as it passes through the device of the present invention.

The fluids are preferably liquids. Most preferably, they are liquids in which at least one substance is present in dissolved and/or suspended form.

Liquids in which at least one substance is present in dissolved and/or suspended form are particularly advantageous in connection with the method of the present invention because the reduced tendency to form deposits is particularly pronounced in the present invention.

"Plate(s)" in the context of the present invention denote flat shaped bodies having a thickness D. The geometry of the plate in the plane is not important for the present invention. However, they are usually circular plates because they are usually to be incorporated horizontally into columns or similar chemical apparatuses known generally to the person skilled in the art as cylindrical. If the spatial extent of the plate in the plane is great, it can be strengthened on the side at which the partial fluid streams emerge, for example by means of struts or other strengthening measures.

Chemical apparatuses within the scope of the invention include any apparatuses in which chemical reactions or substance or heat transport processes can take place. For example, reactors, in particular tubular reactors, or heat exchangers, in particular tubular heat exchangers, and/or apparatuses for separating substances, such as columns or other suitable apparatuses are within the scope of the present invention.

The thickness D of the plate is usually chosen so that the plate withstands its own weight and additionally generally the weight of the fluid located on it. It is generally known to the person skilled in the art how to determine the thickness of a plate on the basis of the material used therefor. Alternatively, the thickness D of the plate can also be chosen to be very small, and strengthening measures, for example in the form of struts, can be used instead.

The plate can be made of any material(s) generally known in chemical apparatus construction. The plate is usually made of a material which is simple to machine (e.g., by drilling or cutting), such as metal(s) or polymer(s). Preferably, the plate is made of a metal material. More preferably, the plate is made of steel. Most preferably, the plate is made of stainless steel.

The use of metal materials, such as, for example, steel or stainless steel, is particularly advantageous because such materials are particularly strong, so that the thickness D can be chosen to be small or strengthening measures, for example by means of struts, can generally be omitted. Stainless steel is particularly advantageous because it is stable to chemical attack (e.g. corrosion) by most liquids. It is generally known to the person skilled in the art how to select a stainless steel for a particular application of the device according to the invention on the basis of the steel's alloying constituents.

The specific material used to produce the plate required for the present invention is not important for the effectiveness of the invention. It is important only that the material used can be rounded and/or chamfered. The method by which this is achieved can be any method that appears suitable therefor to the person skilled in the art.

The plate of the distributor device is preferably arranged in the chemical reaction apparatus exactly perpendicularly to the main direction of flow of the fluid that passes through the apparatus. Most preferably, the plate is arranged exactly horizontally.

Arrangement perpendicularly to the main direction of flow of the fluid passing through the apparatus is advantageous because no partial region of the distributor device is exposed to more fluid than any other. Uniform distribution can thereby be ensured. The horizontal arrangement is particularly advantageous when the fluid to be distributed is a liquid that flows vertically through a chemical apparatus from top to bottom or from bottom to top. It can thereby be ensured that no partial region of the distributor device is exposed to more fluid than any other.

The openings in the plate can have any geometric shape. Openings in the form of holes or slots are preferred. Openings in the form of holes are more preferred and openings in the form of circular holes are most preferred.

Holes and slots are advantageous because they can be introduced into the plate by simple means, for example by drilling and/or cutting. Other geometric shapes are more complex to produce but are otherwise equally as suitable as holes and slots.

The openings in the plate can be distributed over the plate of the distributor device regularly or irregularly. The openings are preferably distributed regularly over the plate.

A regular arrangement is advantageous because uniform distribution of the fluid can better be achieved thereby.

The size and number of the openings is usually governed by the amount of fluid that is to be distributed and is usually chosen so that the Reynolds number of the flow of the fluid on leaving the openings is not more than 1.

In connection with the present invention, the Reynolds number denotes the dimensionless index number generally known to the person skilled in the art as $$Re = \frac{u \cdot d}{v},$$

where u is the velocity of the partial fluid stream as it leaves the openings, v denotes the kinematic viscosity of the fluid and d denotes the diameter of the openings when they are circular or the slot width when they are in slot form or the characteristic length of the opening, determined by principles generally known to the person skilled in the art, when neither of the two above-mentioned geometries is present.

The number of openings in a plate is preferably from 10 to 10,000, most preferably from 100 to 5000.

The openings of the distributor device are preferably rounded or chamfered at least on the side of the plate 2 from which the fluid passes through the plate.

The openings can also be rounded or chamfered on both sides of the plate 2. It is likewise possible for the openings to be chamfered on one side of the plate and rounded on the other side of the plate.

Preferably, the openings are chamfered or rounded on only one side of the plate.

In connection with the present invention, rounded means that a geometric irregularity, for example a 90° angle, is replaced by a regular geometry, for example, a semi-circle.

In other words, "rounded" in the context of the present invention means that no edges are created in the region of the entry into an opening. Instead, the flat surface of the plate (outside the openings) merges into the surface of the openings in the region of the passage through the plate without the creation of edges.

In the context of the present invention, chamfered means that a geometric irregularity, for example a 90° angle, is replaced by a geometry that is likewise irregular but, compared with the original geometric irregularity, is more similar to a geometrically regular geometry (e.g., two 45° angles).

In other words, "chamfered" in connection with the present invention means that no sharp edges are created in the region of the entry into an opening. Instead, the flat surface of the plate (outside the openings) merges into the surface of the openings in the region of the passage through the plate without the creation of sharp edges (i.e., preferably without angles α, β≥60).

Figure 3:
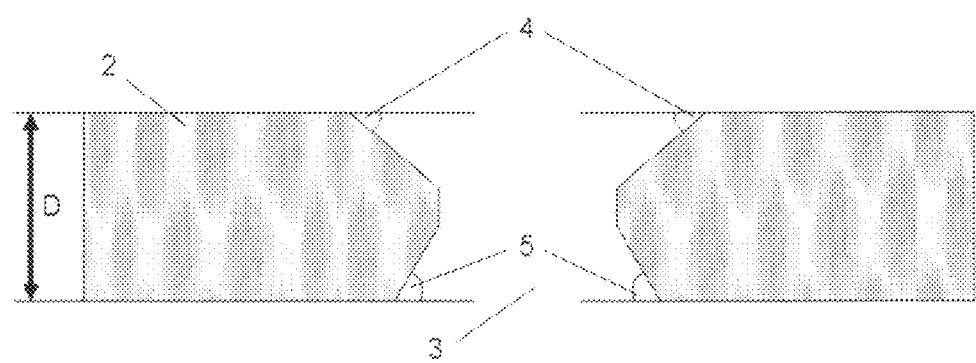
FIG. 3 illustrates a section through one of the holes shown in FIG. 1.

The angle α is the angle between the flat surface of the plate and the surface of the opening on the inlet side of the partial fluid stream, and the angle β is the angle between the flat surface of the plate and the surface of the opening on the outlet side of the partial fluid stream. This is illustrated in FIG. 3, where the reference numeral 4 represents the angle α and the reference numeral 5 represents the angle β.

A distributor device including at least one plate 2 having openings 3 is preferably characterized in that the flowed-through cross-section in the region of the passage through the plate (i.e., preferably in the range from 30% to 70% of the flowed-through length of the opening, which corresponds to the thickness D of the plate) is smaller than in the region of the entry into the opening.

If the openings in the plate are rounded, the openings are preferably so rounded that the radius R of the partial circle formed by rounding is smaller than the thickness of the plate.

If the openings in the plate are chamfered, the openings are preferably so chamfered that the angle is between 40° and 60°. The opening is also preferably so chamfered that the chamfer does not extend as far as half the thickness D of the plate.

The present invention is explained in greater detail in relation to the figures, without limiting the invention thereto.

FIG. 1 illustrates a distributor device suitable for carrying out the method of the present invention which includes a circular plate 2 having openings 3 in the form of holes distributed regularly in plate 2.

Figure 2:
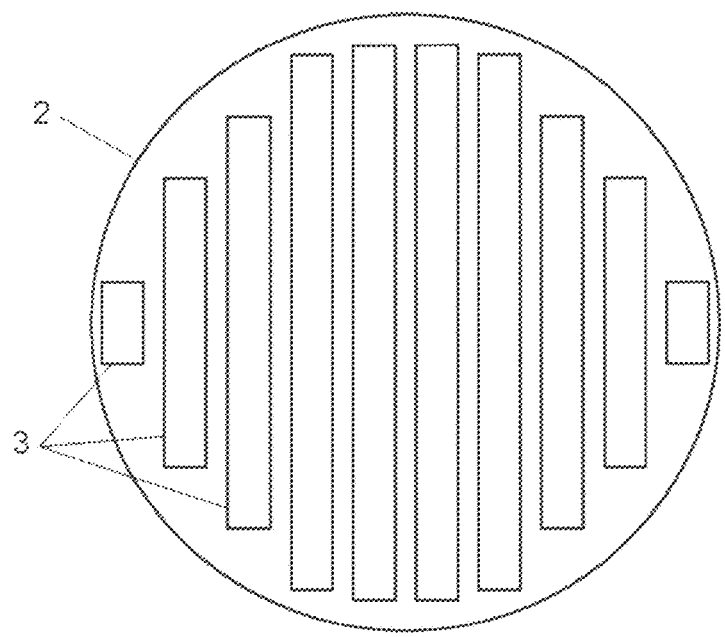
FIG. 2 illustrates a distributor device suitable for carrying out the method of the present invention.

FIG. 2 illustrates a distributor device suitable for carrying out the method of the present invention which is made up of a circular plate 2 having openings 3 in the form of slots distributed regularly in the plate 2.

FIG. 3 shows a section through one of the holes 3 shown in FIG. 1, the opening being chamfered on both sides at an angle α, β. Reference numeral 4 represents the angle α and reference numeral 5 represents the angle β. D represents the thickness of the plate 2.

Figure 4:
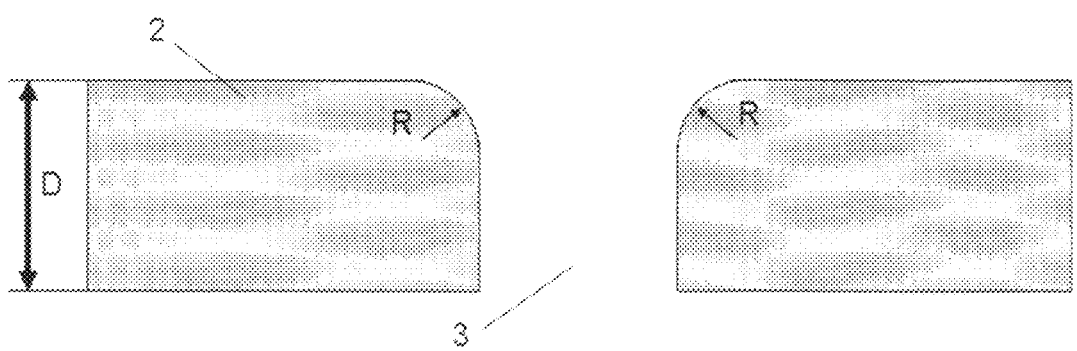
FIG. 4 illustrates a section through one of the openings shown in FIG. 2.

FIG. 4 shows a section through one of the openings 3 shown in FIG. 2, the opening being rounded on one side of the plate with a radius R<D. D represents the thickness of the plate 2.

Figure 5:
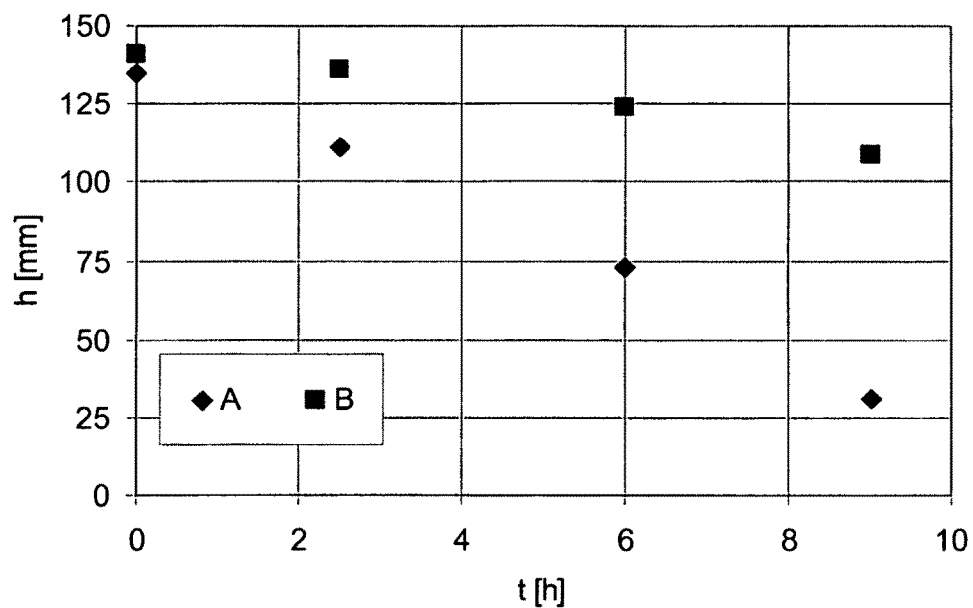
FIG. 5 is a graphic representation of the test results from Example 1.

FIG. 5 shows a graphic representation of the test results of Example 1.

Figure 6:
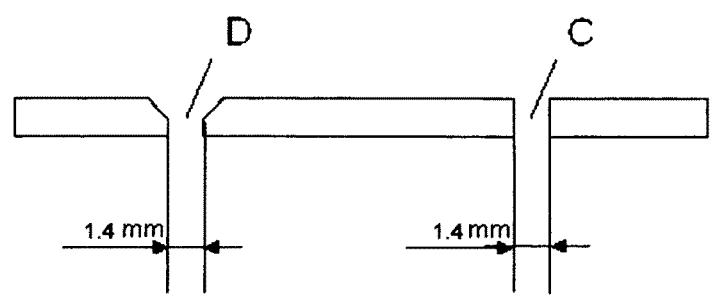
FIG. 6 illustrates a test arrangement (Example 2) in diagrammatic form.

FIG. 6 shows a test arrangement (Example 2) in diagrammatic form.

The present invention is explained in detail hereinbelow with reference to examples but without being limited thereto.

EXAMPLES

Example 1

Deposition and crystallization fouling tests were carried out in a laboratory test. Butyl rubber/hexane was used as the test liquid for the deposition fouling tests, and an aqueous sodium chloride solution was used as the test liquid for the crystallization fouling tests. The test apparatus was made up of a container into which test liquid flowed continuously. The container had in one of its perpendicular walls (thickness: 2 mm) openings of various kinds from which the test liquid flowed again in an arc in the form of a jet. The openings were two circular holes (diameter: 2 mm), the first hole being formed with sharp edges (cylindrical) and the second having a chamfer (according to the invention). A 45° chamfer was chosen, which took in half the wall thickness.

In the durability test, fouling at the various openings was investigated. Evaluation was made on the one hand by dismantling the perforated plate at the end of the test and visually assessing the deposits at or in the holes, and on the other hand by measuring the projection ranges or heights of the point of impact h on the opposite wall, which was positioned about 5 cm away from the two openings in the horizontal direction. A in FIG. 5 represents the hole with sharp edges (without a chamfer). B in FIG. 5 represents the chamfered hole (with a chamfer). Both the visual assessment and the measurements showed that, for both mechanisms of fouling (crystallization and deposition fouling), chamfering (according to the invention) or rounding (according to the invention) of the discharge holes results in a lower tendency to fouling. FIG. 5 shows a graphical representation of the measured heights of the point of impact h at different times t.

Example 2

The device for dividing liquid streams used in this Example was in the form of a flat, round plate in a series of screening tests to study the fouling behavior of distributor holes and was tested at temperatures from 80° C. to 220° C. The stainless steel plate of thickness 2 mm was provided with two geometrically different holes (diameter in each case 1.4 mm in order to ensure equivalence of the effective through-flow surfaces) (FIG. 6). Hole C is a simple straight bore. The second hole D was produced with a chamfer (45°. The test liquid used was a medium-viscosity liquid having a density of from 700 to 1200 kg/m$^3$ and a viscosity in the range from 1 mPas to 100 mPas, whose surface tension was in the range from 15 to 50 mN/m. The liquid contained dissolved constituents. The liquid underwent several decomposition reactions, some of which have not been explained mechanistically. Both solid constituents in the form of very fine crystals (a suspension formed during the test) and constituents in the form of high molecular weight, undefined coating-forming products (fouling) formed.

The fluid used was guided in a heated circuit under a protecting atmosphere, the distributor plate was covered with a liquid layer of from 0 to 300 mm. The rate at which the fluid that passed through the plate was re-circulated by pumping determined the liquid level on the perforated plate, the liquid level determining the run-off behavior or the run-off velocity through the distributor holes owing to the hydrostatic height.

The tests effectively lasted 10 days, with a break of 2 days in each case. On the basis of the sizes of the craters in the coating on the plate around the holes, it was possible to establish that the fluid ran off better through the chamfered hole (higher run-off rate at hole edges). The stainless steel perforated plate was coated at the end of the test with a very solid, pasty precipitate, which was difficult to remove even at high temperatures; however, the chamfered holes were passable compared with straight holes.

In particular, with a low liquid level on the distributor plate, a difference could be observed in the run-off behavior of the fluid through the two types of holes of different geometries. The running off of the fluid through the distributor hole with a chamfer exhibited advantageous behaviour compared with the straight hole. With a very low hydrostatic pressure on the plate (liquid level between 10 and 20 mm), the chamfered hole was passable from the start due to the smaller pressure loss (lower stress factors and lower pressure drop). By contrast, the straight hole required a higher level (40-50 mm) in order to be able to observe equivalent run-off of the fluid. The tests have clearly shown that the distributor hole with chamfered geometry exhibits better run-off behaviour during stationary operation than does the hole having sharp edges.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for dividing a fluid stream into uniform portions of the stream in a chemical apparatus comprising:
   a) passing at least one fluid stream into a distributor device located in the chemical apparatus comprising:
      (i) at least one plate having 100 to 5000 openings, the openings being rounded on at least one side of the plate in a manner such that the two or more uniform portions of the stream form,
   and
   b) causing the fluid streams formed to exit the distributor device
      wherein the fluid streams are liquid fluid streams in which at least one substance is present in dissolved and/or suspended form and the distributor device reduces the formation of deposits in the chemical apparatus of the substances dissolved or suspended in the liquid stream, and
      wherein the openings are rounded to an extent such that a partial circle thus formed has a radius R smaller than the plate's thickness.

2. The method of claim 1 in which the partial fluid streams flow with a Reynolds number of ≤1 on leaving the openings.

3. The method of claim 1, wherein the chemical apparatus is an apparatus in which a chemical reaction or heat transfer takes place and is a reactor, a tubular heat exchanger or a cylindrical column.

4. The method of claim 1, wherein the chemical apparatus is a reactor or a tubular heat exchanger.

5. A distributor device comprising at least one plate having 100 to 5000 openings that are rounded on at least one side of the plate,
   wherein the distributor device is positioned within a chemical apparatus and divides a fluid stream into two or more uniform fluid portions of the stream, wherein the fluid stream is a liquid fluid stream in which at least one substance is present in dissolved and/or suspended form and the distributor device reduces formation of deposits in the chemical apparatus of substances dissolved or suspended in the stream, and
   wherein the openings are rounded to an extent such that a partial circle thus formed has a radius R smaller than the plate's thickness.

6. The device of claim 5, wherein the chemical apparatus is an apparatus in which a chemical reaction or heat transfer takes place and is a reactor, a tubular heat exchanger or a cylindrical column.

7. The device of claim 5, wherein the chemical apparatus is a reactor or a tubular heat exchanger.

8. The method of claim 1, wherein the openings in the plate are in the form of holes or slots.

9. The device of claim 5, wherein the openings in the plate are in the form of holes or slots.

* * * * *